(12) United States Patent
Hoefsloot

(10) Patent No.: US 10,099,672 B2
(45) Date of Patent: Oct. 16, 2018

(54) SYSTEM FOR MEASURING BRAKE BALANCE ON MULTI-AXEL COMMERCIAL VEHICLES BY MONITORING BRAKE TEMPERATURES

(71) Applicant: Gerald Hoefsloot, Armstrong (CA)

(72) Inventor: Gerald Hoefsloot, Armstrong (CA)

( * ) Notice: Subject to any disclaimer, the term of this patent is extended or adjusted under 35 U.S.C. 154(b) by 481 days.

(21) Appl. No.: 14/538,197

(22) Filed: Nov. 11, 2014

(65) Prior Publication Data

US 2016/0129898 A1  May 12, 2016

(51) Int. Cl.
*B60T 17/22* (2006.01)

(52) U.S. Cl.
CPC ............ *B60T 17/22* (2013.01); *B60T 17/221* (2013.01)

(58) Field of Classification Search
CPC .............................. B60T 17/22; B60T 17/221
USPC ............ 340/438, 425.5, 426.1; 303/191, 20; 188/1.11 E, 1.11 R, 181 T, 195
See application file for complete search history.

(56) References Cited

U.S. PATENT DOCUMENTS

| | | | |
|---|---|---|---|
| 3,582,926 A | 6/1971 | Hassan | |
| 4,790,606 A * | 12/1988 | Reinecke | B60T 8/00 188/1.11 E |
| 5,140,851 A | 8/1992 | Hettich | |
| 5,446,451 A | 8/1995 | Grosskopf, Jr. | |
| 5,656,993 A | 8/1997 | Coulthard | |
| 5,812,053 A | 9/1998 | Kovak | |
| 6,680,672 B2 | 1/2004 | Borugian | |
| 6,934,618 B2 | 8/2005 | Eckert et al. | |
| 7,009,508 B2 | 3/2006 | Vertenten | |
| 7,301,478 B1 * | 11/2007 | Chinn | B60Q 1/46 340/435 |
| 7,652,562 B2 | 1/2010 | White et al. | |

(Continued)

FOREIGN PATENT DOCUMENTS

| | | |
|---|---|---|
| CA | 2200647 | 9/1998 |
| CA | 2205516 | 11/1998 |

(Continued)

OTHER PUBLICATIONS

International Searching Authority, The International Search Report and the Written Opinion of the International Searching Authority, or the Declaration, International Application No. PCT/CA2015/051165, Filed Nov. 10, 2015, 8 pages, Receiving Office—Canadian Intellectual Property Office.

*Primary Examiner* — Daryl Pope
(74) *Attorney, Agent, or Firm* — Richard D. Okimaw

(57) ABSTRACT

The present invention provides a system for monitoring brake balance of a motor vehicle by measuring temperatures of each wheel having a temperature sensor constructed and arranged for measuring temperature of a motor vehicle brake and recording each temperature measurement as a temperature reading, a communications link between said sensors and a data compiler, wherein the communication link receives transmitted information from each of said sensors relating to temperature readings, a temperature groups sorter configured to receive information on temperature readings from said data compiler and sorts each reading into one of at least two groups based on a selected temperature group range, and an output configured for output of information relating to said temperature readings from said temperature groups sorter.

7 Claims, 5 Drawing Sheets

(56) References Cited

U.S. PATENT DOCUMENTS 8,717,159 B2 5/2014 Todd et al.
2013/0278771 A1* 10/2013 Magoun .................. H04N 5/33
　　　　　　　　　　　　　　　　　　　348/148

FOREIGN PATENT DOCUMENTS

CA　　　　2734061　　9/2011
WO　　　84/00406　　2/1984

* cited by examiner

SYSTEM FOR MEASURING BRAKE BALANCE ON MULTI-AXEL COMMERCIAL VEHICLES BY MONITORING BRAKE TEMPERATURES

BACKGROUND OF THE INVENTION

Commercial trucks and trailers have air brake systems, the most common of which function by using compressed air to operate a brake chamber on each wheel, which puts pressure on a pushrod that rotates a camshaft, applying an outward motion of the brake shoes against the brake drum. Each wheel can have a difference in pressure applied to the drums for a variety of reasons, such as brake adjustment, valve crack pressures, air leaks, worn or sticky brake components, etc. Uneven braking can be dangerous, and will cause the brakes to wear out prematurely. With a tractor/trailer combination it can result in a jack-knife situation if the braking isn't evenly balanced between the truck and trailer, but the driver has no way of knowing if his brakes are all balanced.

Commercial truck and trailer manufacturers are currently required to build the units with Anti-Lock Braking Systems (ABS), which works by using sensors to determine if a wheel is locking up on slippery surfaces, and reduces the braking pressure on that wheel to help maintain control of the vehicle. A vehicle could potentially be operating with several wheels out of adjustment or other mechanical issues, but in a lockup situation the ABS sensors may actually reduce the braking of the adjusted wheels.

SUMMARY OF THE INVENTION

The present invention is unique from the other systems and devices because it will easily identify to a driver at all times the status of his braking system, and any differential between the wheels. The payback through reduced fines and roadside repairs, as well as reduced maintenance costs, will be very significant. The potential costs saved through insurance claims and lost lives is immeasurable.

The present invention is a Thermal Brake Sensor (TBS) that is not meant to take the place of ABS, but is more beneficial to assist the driver in knowing that his brakes are all working evenly, and if his brakes are becoming dangerously hot.

The invention is also contemplated as used by the repair shop to help diagnose potential braking problems, as it will log any faults or events in the Electronic Control Unit (ECU). The equipment manager can also use the information from the ECU to determine if excessive braking has taken place. Most drivers are unaware if their brakes are working evenly, unless they check the heat of each brake drum by hand. It is a common sight to see trucks with smoke billowing from their brakes, and have brake shoes that have obviously been very hot. It would be advantageous to know when the events took place, to help develop better driving habits.

The invention, in one embodiment, includes 3 main components, connected by standard cabling. At the wheels is a thermocouple capable of measuring temperatures from 32 F-1200 F. The information will feed into an ECU capable of storing information for the lifetime of the product. An on-board monitor will be fed from the ECU. It can be personalized by each manufacturer, but may be a screen with a bar graph for each wheel, changing from green to red as the heat increases. It may also have a dial gauge for each wheel. The monitor may also be equipped with a warning buzzer to bring a high temperature (or possibly a discrepancy between wheels) to the attention of the driver. The ECU will store the data, which can be retrieved easily at the maintenance facility to determine if the unit has had an extreme braking event. Although the main target market for this would be the commercial transport industry, there could also be applications in light passenger vehicles, trains, industrial equipment, aircraft, etc.

The use of brakes is based on a simple concept—Friction. Friction creates heat, which increases exponentially with the pressure applied to the brakes. It is virtually impossible to accurately measure the pressure applied to each wheel, but it is very easy (and accurate) to measure the temperature, which in turn identifies the amount of friction being created, and the pressure being applied. As brakes get hot, they tend to become less effective through "brake fade", requiring the driver to apply even more pressure, and can eventually become so hot that they will start smoking or, in extreme cases, will even catch fire. By that time it is usually too late to take corrective action. An on-board monitor would let the driver know immediately if any of the brakes were getting dangerously hot, and were all evenly balanced.

As used herein, the term "brake balance" is understood to mean that all of the brakes on a motor vehicle are providing substantially similar amounts of braking to ensure vehicle stability and reduced wear of the brake components wherein said amounts of braking are monitored by the system of the present invention.

In one embodiment, the present invention is a system for monitoring brake balance by measuring the brake temperature of individual wheels of a motor vehicle, said system comprising:

at least two sensors constructed and arranged for measuring temperature of a motor vehicle brake and recording each said temperature measurement as a temperature reading;

a communications link between said sensors and a data compiler, wherein said communication link receives transmitted information from each of said sensors relating to temperature readings;

a temperature groups sorter configured to receive information on temperature readings from said data compiler and sorts each reading into one of at least two groups based on a selected temperature group range; and an output configured for output of information relating to said temperature readings from said temperature groups sorter.

In one embodiment, each axel has a single sensor.

In one embodiment, each brake has a single sensor.

In one embodiment, the communications link is a wired link, a wireless link, or combinations thereof.

In one embodiment, the output is a visual display configured to display relative temperature measurements.

In one embodiment, the output is a visual display configured to display relative temperature measurements and provide an alert if a maximum temperature differential threshold is exceeded.

In one embodiment, the output is a visual display configured to display relative temperature measurements and provide an audio alert if a maximum temperature differential threshold is exceeded.

In one embodiment, the visual display configured to display relative temperature measurements and provide an audio and visual alert if a maximum temperature differential threshold is exceeded.

While motor vehicles often have many gauges providing numeric readings of measured sensors, in a preferred embodiment, the driver is able to look a panel with a plurality of lights and assess if there is a temperature differential based on illuminated lights without the need to look at individual temperature readings.

In one embodiment, the invention is a system for monitoring brake temperatures of a motor vehicle, said system consisting essentially of:
temperature sensors constructed and arranged for measuring temperature of a motor vehicle brake on an axle, each axle having two sensors, and recording each said temperature measurement as a temperature reading;
a communications link between said sensors and a data compiler, wherein said communication link receives transmitted information from each of said sensors relating to temperature readings;
a temperature groups sorter configured to receive information on temperature readings from said data compiler and sorts each reading into one of at least two groups based on a selected temperature group range; and
an output configured with a single set of lights associated with each sensor for visual output of information relating to said temperature readings from said temperature groups sorter, whereby each set of lights illuminates a number of lights based on temperature.

DETAILED DESCRIPTION OF THE PREFERRED EMBODIMENT

In all motor vehicles, the proper maintenance of the brake system provides for an urgent measure regarding safety. As is understood by persons with skill in the art, when dealing with a vehicle having complex braking systems, it becomes more difficult to monitor their proper function.

The present invention provides a system that is customizable and configurable for vehicles having multiple axles.

Figure 1:
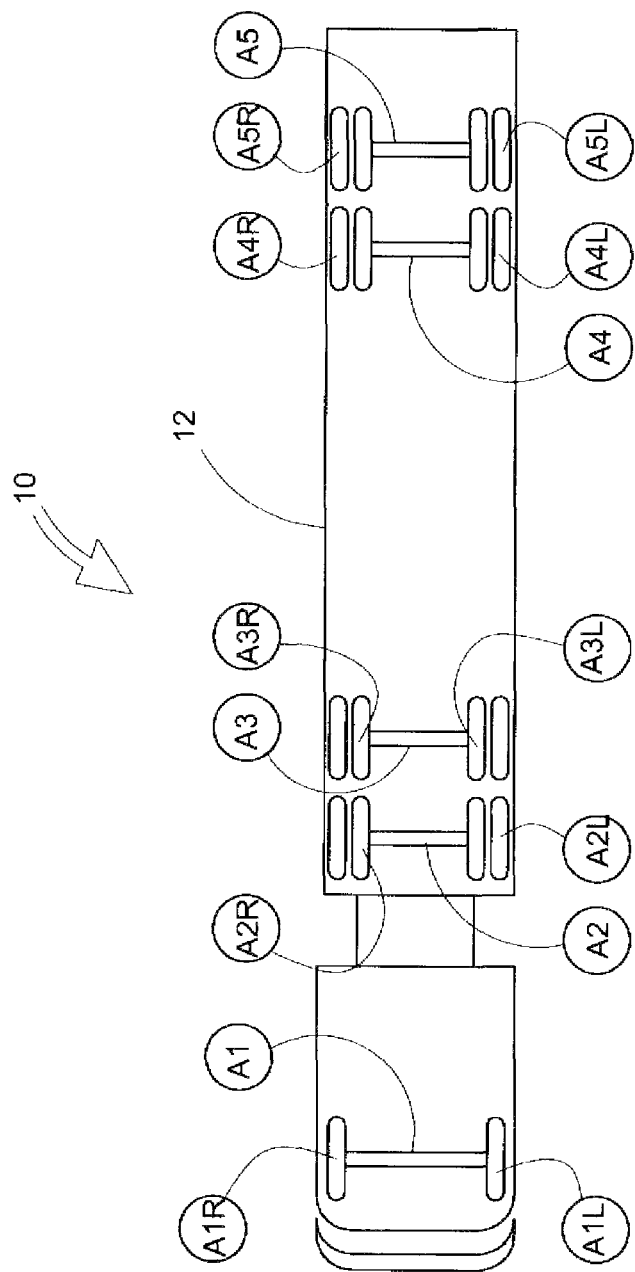
FIG. 1 is a plan view of a system according to one embodiment of the present invention.
Figure 2:
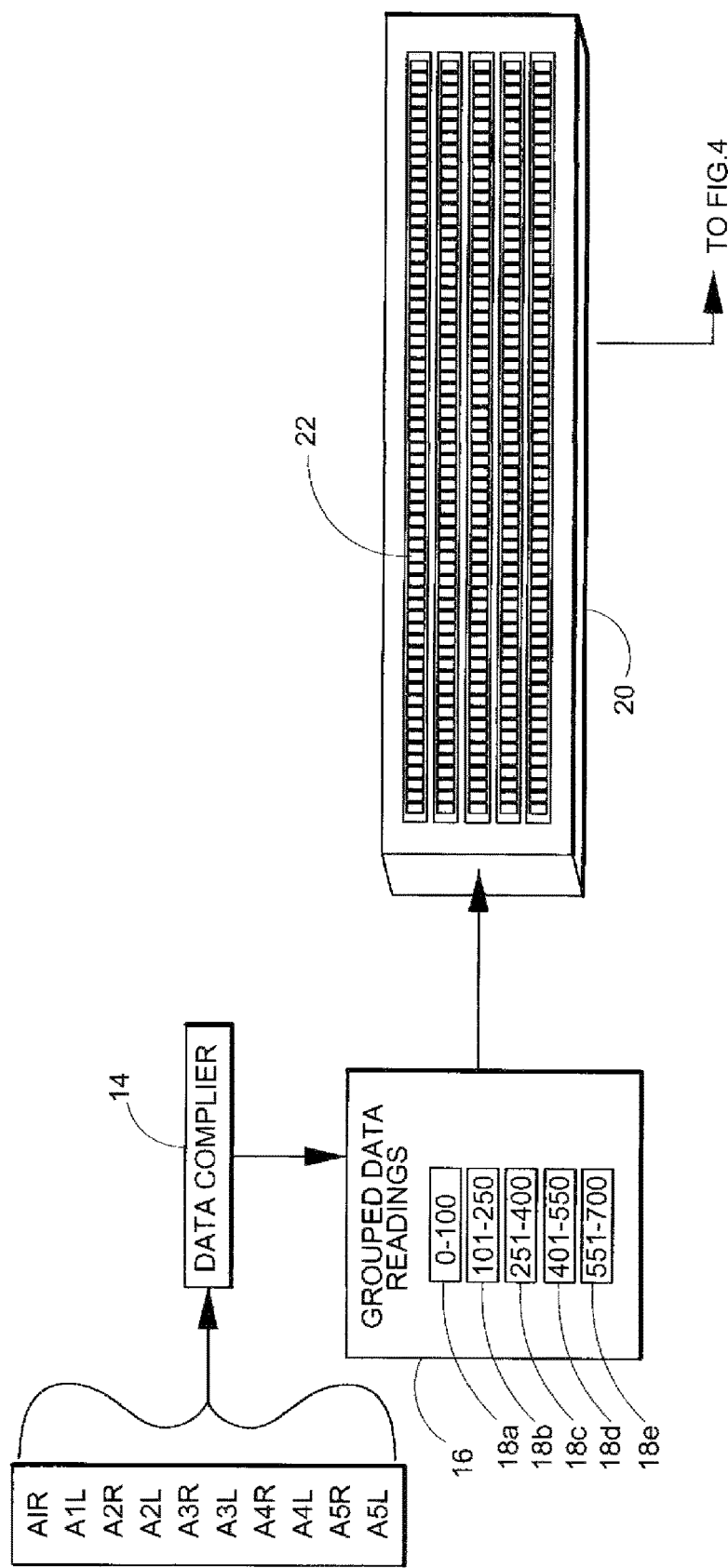
FIG. 2 is a system schematic according to one embodiment of the present invention.
Figure 3:
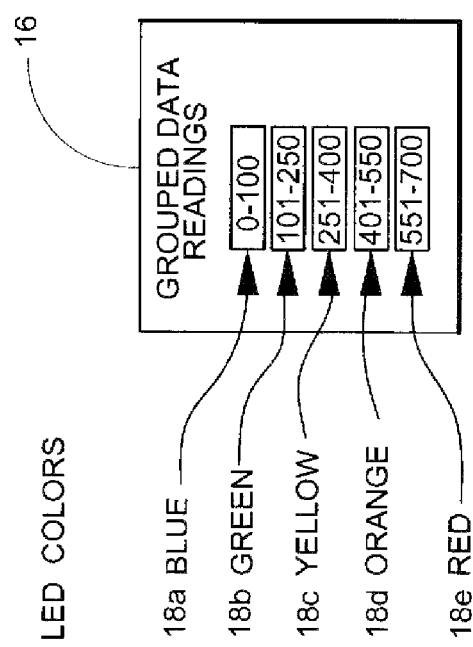
FIG. 3 is a view demonstrative of indicators used in the system point to one embodiment of present invention.

System 10 is configured for use on vehicle 12. Although the present system demonstrated in the figures is for an 18 wheel vehicle, the system is customizable and configurable for vehicles having less wheels and more wheels. As demonstrated in FIG. 1: first axle has a first axle sensor A1 and has a right first axle wheel brake A1R and a left first axle wheel brake A1L; second axle has a second axle sensor A2 and has a right second axle wheel brake A2R and a left second axle wheel brake A2L; third axle has a third axle sensor A3 and has a right third axle wheel brake A3R and a left third axle wheel brake A3L; fourth axle has a fourth axle sensor A4 and has a right fourth axle wheel brake A4R and a left fourth axle wheel brake A4L; fifth axle has a fifth axle sensor A5 and has a right fifth axle wheel brake A5R and a left fifth axle wheel brake A5L.

Each axle sensor is operatively associated with data compiler 14 that receives temperature measurement information from each sensor.

In one embodiment, each axle has a single sensor. In another embodiment, each individual wheel has an individualized sensor. Data compiler 14 is operatively associated with a temperature measurement, group sorter 16 that provides for grouping individualized data readings from each sensor. As an example, group 18A sorts temperature readings between zero and 100° F., group 18B sorts temperatures between 101° F. and 250° F., group 18C groups temperatures between 251° F. and 400° F., group 18 the groups temperatures between 401° F. and 550° F., and group 18E sorts temperatures between 551° F. and 700° F. These temperature readings are grouped by way of example only and the system is configurable as desired. Temperature measurement groups order 16 is further associated with readout count of console 20 whereby console 20 has a plurality of indicator lights 22 that are configurable to demonstrate temperatures.

Figure 4A:
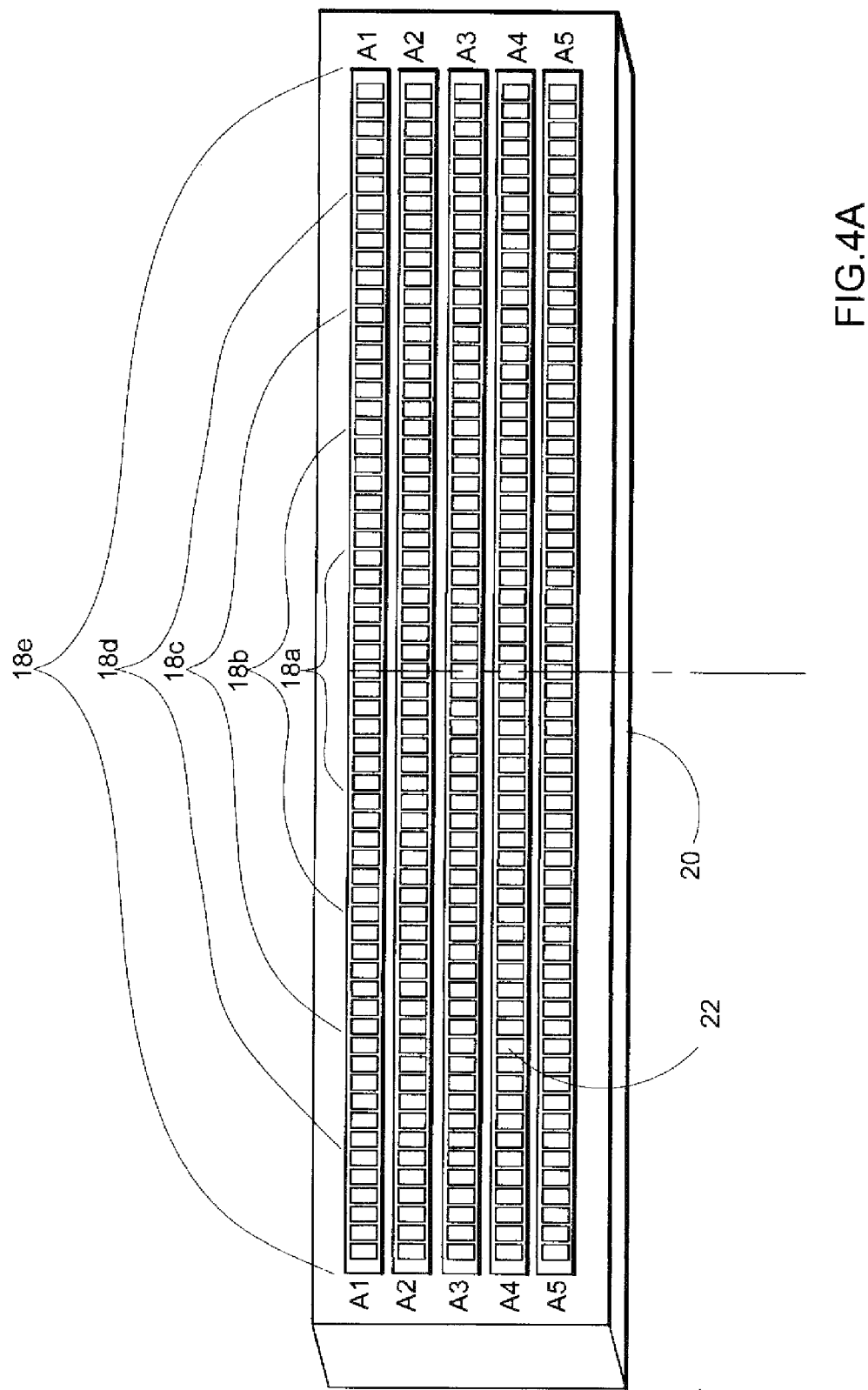
FIG. 4A is a display panel positioned for use by a driver according to one embodiment the present invention.
Figure 4B:
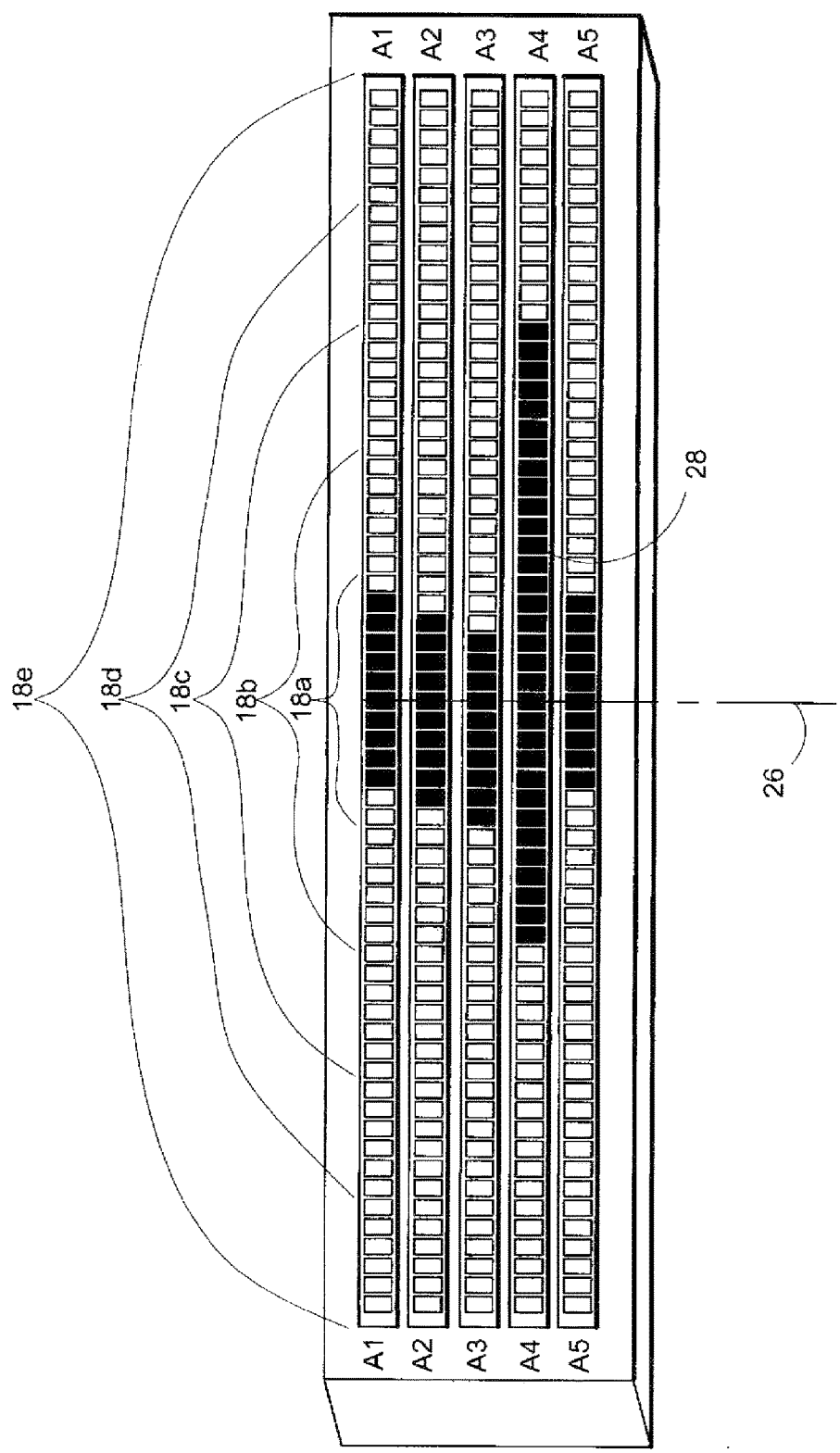
FIG. 4B is a display panel positioned for use by a driver according to one embodiment the present invention demonstrating visual display of temperature on the panel.

In one embodiment, a driver merely looks at console 20 and looks for congruity amongst a plurality of indicator lights which demonstrates that each brake sensor is operating at similar temperatures. If one sensor is operating at a temperature different than the others the indicator lights will not have the same amount of light illuminated. For example, as demonstrated in FIG. 4B, lights will emanate outward from the center line 26 according to the temperature ranges grouped by the temperature measurement group sorter 18. As demonstrated in FIG. 4B, rows A1, A2, A3, and A5 are illuminated with similar numbers of lights. Row A4 has many more lights illuminated. Once a driver is alerted of a temperature difference by the difference in illuminated lights, the driver can immediately attend to having brakes checked and serviced. This system does not require a driver to look at gauges with numbers or to even know what numbers are normal and/or acceptable. One sensor is different from the others, which can be either hotter or cooler, and the driver knows there is a problem.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A system for monitoring brake balance of a motor vehicle by measuring individual brake temperatures, said system comprising:
at least two sensors each constructed and arranged as thermocouples capable of outputting a temperature measurement from 32 F-1200 F of a motor vehicle individual brake and recording each said temperature measurement as a temperature reading;
an Electronic Control Unit (ECU);
a communications link between said at least two sensors and said ECU, wherein said communications link receives transmitted information from each of said at least two sensors relating to said temperature readings and delivers said transmitted information to a data compiler within said ECU, and wherein said ECU is configured to determine a temperature difference between said temperature readings of said individual brakes;
a temperature group sorter within said ECU configured to receive said transmitted information on temperature readings from said data compiler and sort each of said temperature readings into one of at least two groups based on a selected temperature group range;

an output configured to present information received from said ECU relating to said temperature readings from said temperature group sorter including information of brake balance of all said individual brakes of said motor vehicle; and wherein said output includes a visual display configured to display relative temperature measurements and provides an alert if said temperature difference exceeds a predetermined threshold.

2. The system of claim 1 wherein each axle has a single sensor.

3. The system of claim 1 wherein each said individual brake has a single sensor.

4. The system of claim 1 wherein said communications link is a wired link, a wireless link, or combinations thereof.

5. The system of claim 1 wherein said alert is an audio alert.

6. The system of claim 1 wherein said alert is an audio and visual alert.

7. A system for monitoring brake temperatures of a motor vehicle, said system comprising:

at least two sensors each constructed and arranged as thermocouples capable of outputting a temperature measurement from 32 F-1200 F of a motor vehicle individual brake and recording each said temperature measurement as a temperature reading;

an Electronic Control Unit (ECU);

a communications link between said at least two sensors and said ECU, wherein said communications link receives transmitted information from each of said at least two sensors relating to said temperature readings and delivers said transmitted information to a data compiler within said ECU, and wherein said ECU is configured to determine a temperature difference between said temperature readings of said individual brakes;

a temperature group sorter within said ECU configured to receive said transmitted information on temperature readings from said data compiler and sort each of said temperature readings into one of at least two groups based on a selected temperature group range;

an output configured to present information received from said ECU relating to said temperature readings from said temperature group sorter including information of brake balance of all said individual brakes of said motor vehicle; and wherein said output includes a visual display configured to display relative temperature measurements and provides an alert if said temperature difference exceeds a predetermined threshold.

\* \* \* \* \*